Patented Aug. 19, 1952

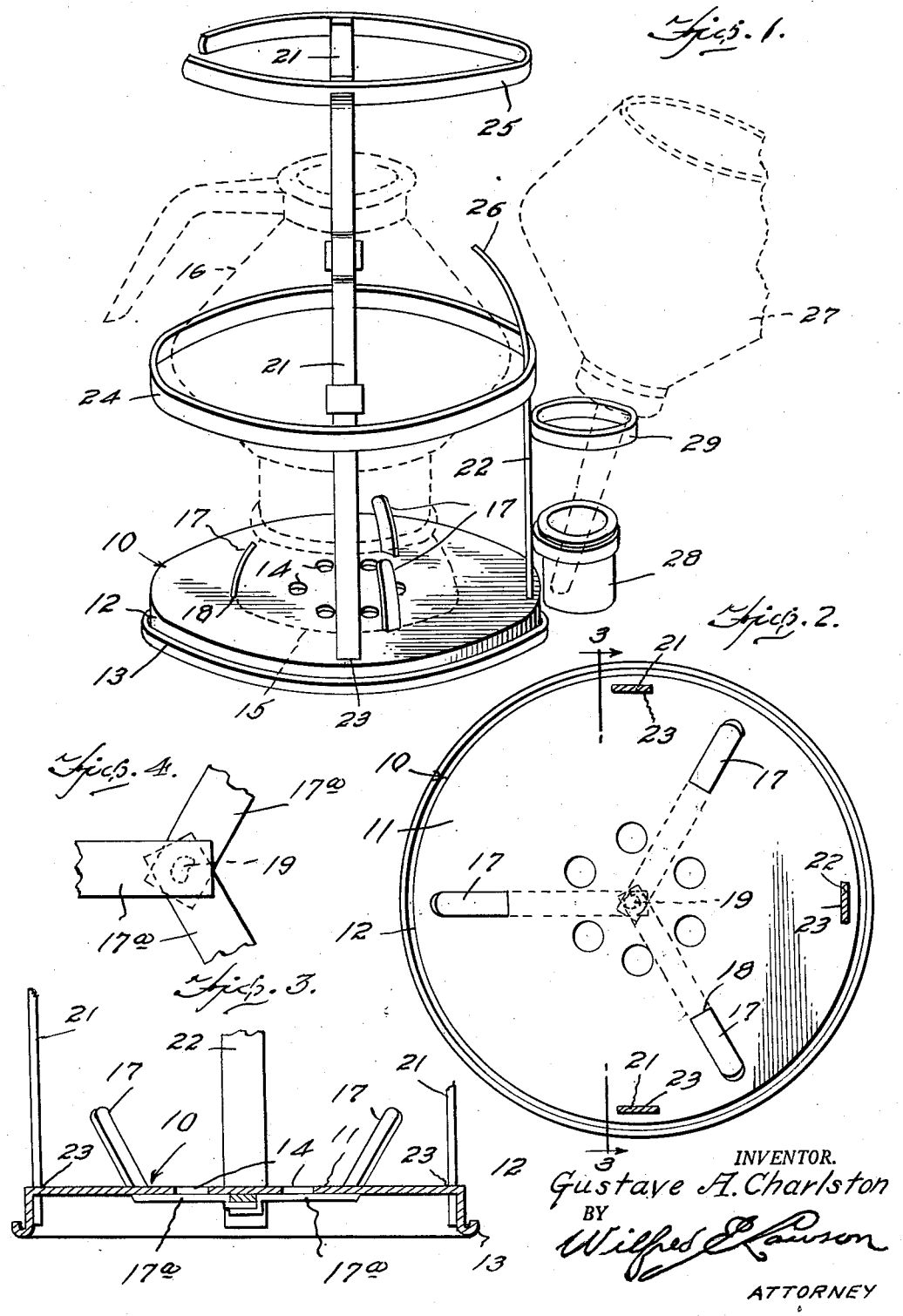

2,607,285

UNITED STATES PATENT OFFICE 2,607,285

GLASS COFFEE MAKER GUARD

Gustave A. Charlston, Portland, Oreg.

Application December 29, 1949, Serial No. 135,628

1 Claim. (Cl. 99—290)

This invention relates to improvements in guard devices and supports for two part glass coffee makers and is directed particularly to improvements in the bottom or base part thereof.

In my prior Patent No. 2,292,430 there is shown a glass coffee maker guard wherein the support for the heater unit upon which the lower globe rests, comprises an open wire frame having a center ring or spider to which are secured a number of bendable arms which may be made to engage the bottom of the heater unit to retain the latter in position.

The present invention has for its principal object to provide an improved base of a type to be easily shaped from a single piece of material and to which bendable holding fingers may be easily secured, thereby providing a structure of stronger construction and one which can be more rapidly and economically made than the base of the structure shown in the above identified patent.

Another object is to provide a base for a guard of the character stated which is made by pressing or stamping from a single piece of sheet metal.

Another object is to provide a base of the character stated, which is stamped from a single sheet of metal and to which bandable clamping or securing fingers are secured in a novel manner, the base having a downturned supporting flange by which the part upon which the heating unit rests is maintained at an elevation above the underlying supporting surface.

Other objects and advantages of the present invention will become apparent from the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in perspective of my glass coffee maker guard showing a base therefor constructed in accordance with the present invention.

Figure 2 is a horizontal section through the guard taken at an elevation above and looking down toward the securing fingers.

Figure 3 is a detail section taken substantially on the line 3—3 of Figure 2.

Figure 4 is a detail plan view of the lapped ends or bottom portions of the fingers showing the manner of joining the same together.

Referring now more particularly to the drawing it will be seen that Figure 1 discloses a complete guard structure which comprises the present improved base which is generally designated 10.

The base 10 is pressed or stamped from a single sheet of metal of suitable kind and weight, to have the flat, circular top 11, and the downturned flange or rim 12. This rim supports the top 11 at a suitable elevation above the table top or other surface upon which the guard is placed and to prevent marring a polished table top the edge portion of the rim is turned or rolled out as indicated at 13 so that a rounded under part is provided.

Formed in a circle around the center of the top 11 are a number of holes 14 punched or cut through the top. These allow air to move from beneath the base up and around the heating unit 15, shown in dotted outline in Figure 1, which rests on the top 11. This unit has resting thereon the bottom part or globe 16 of the coffee maker.

To secure the heating unit 15 against movement on the base a number of bendable fingers 17 are employed, three of such fingers being here shown, and preferred.

The fingers are each formed to have a lower or bottom portion 17a which are arranged to have their ends in overlapping relation where they are secured together by welding, or in any other suitable manner, as indicated at 19.

As shown the top 11 of the base has cut therethrough, in a circle around the circle of holes 14, the slots 18, corresponding in number with the number of fingers 17. The fingers are inserted into these slots 18 from the underside of the top 11, to bring the end portions into position against the underside of the top 11 as shown in Figure 3.

The fingers 17 are formed of any suitable metal which has sufficient ductility to allow the fingers to be bent a great number of times without breaking. However, in the event of breakage, the finger unit can be easily removed and replaced with a complete new unit, without having to employ the services of a mechanic.

The guard structure also includes three uprights or standards, two of which are of the same length and are designated 21, while the third is shorter and is designated 22.

The two standards 21 are located diametrically opposite one another across the base while the third is separated 90° from the two and is at what might be termed the back of the guard. These standards are fixed to the base, in upright position, by having their lower ends extended through slots formed through the top 11 slightly inwardly from the edge so that the end of the standard extending through each slot will lie against the inner side of the flange or rim 12 and is welded thereto.

As shown the three standards 21 and 22 are encircled by the annulus 24, while the top ends of the two taller standards are encircled by the open ring 25, the opening of which is directed forwardly or, in other words, is at the front of the guard.

The short standard 22 has a short portion 26 extending upwardly and inwardly above the ring or annulus 24. This portion 26 functions as a protector for the glass bowl 16 by preventing the top bowl 27 of the coffee maker from swinging around and striking the lower bowl when the top bowl is out of use and supported in the cup 28, as shown.

This cup, which is carried by the standard 22, together with the ring 29, also carried by standard 22, is fully disclosed and claimed in my copending application and no further description of the same in the present case is therefore thought necessary.

From the foregoing it will be seen that there is provided in the present invention a novel base structure which can be economically made and assembled with the other parts of the guard device and which also provides a strong, durable and attractive element of the guard structure.

I claim:

In a guard for a glass coffee maker, including a base having a flat top to seat a heater for the coffee maker, a pair of standards rising from opposite sides of the base adjacent the edge thereof, and a pair of rings supported horizontally between said standards to encircle the lower and upper globes of the coffee maker, said base being circular in plan and having a flat top, a flange depending from about the perimeter of said top and having its lower edge outwardly upturned to provide a rounded supporting surface to prevent marring the surface upon which the guard is positioned during use, said top having a circular series of openings to underlie the said heater for the air cooling of the base thereof and a set of equidistantly spaced slots disposed outwardly from and about said openings, and an L-shaped strip of metal having one leg projecting upwardly through each of said slots to be engaged with the side of said burner and its other leg extending radially inward toward the center of the lower side of said top and secured thereto.

GUSTAVE A. CHARLSTON.

REFERENCES CITED

The following references are of record in the file of this patent:

UNITED STATES PATENTS

| Number | Name | Date |
| --- | --- | --- |
| 55,509 | Liesche | June 12, 1866 |
| 75,045 | Nason | Mar. 3, 1868 |
| 1,014,548 | Willis | Jan. 9, 1912 |
| 1,180,881 | Ricciardelli | Apr. 25, 1916 |
| 1,987,356 | Benson | Jan. 8, 1935 |
| 2,292,430 | Charlston | Aug. 11, 1942 |

FOREIGN PATENTS

| Number | Country | Date |
| --- | --- | --- |
| 28,385 | Germany | Sept. 11, 1884 |